United States Patent [19]

Litehizer, Jr.

[11] Patent Number: 4,589,319

[45] Date of Patent: May 20, 1986

[54] APPARATUS FOR DISPENSING FLAT CABLE ASSEMBLIES

[75] Inventor: Melvin P. Litehizer, Jr., Winston-Salem, N.C.

[73] Assignee: AMP Incorporated, Harrisburg, Pa.

[21] Appl. No.: 679,652

[22] Filed: Dec. 7, 1984

[51] Int. Cl.$^4$ .............................................. B26D 5/20
[52] U.S. Cl. ........................................ 83/423; 83/278; 83/282; 83/444; 83/455; 83/614; 83/620; 83/649; 83/734
[58] Field of Search ................ 83/278, 282, 247, 401, 83/423, 444, 455, 614, 620, 649, 450, 447, 231, 232; 198/736, 747, 772; 226/68, 67, 151, 147

[56] References Cited

U.S. PATENT DOCUMENTS

| | | | |
|---|---|---|---|
| 1,060,291 | 4/1913 | Small | 83/278 |
| 1,650,556 | 11/1927 | Weber | 83/278 X |
| 2,872,979 | 2/1959 | Schultz et al. | 83/278 X |
| 3,983,772 | 10/1976 | Oldham | 83/444 X |
| 4,060,875 | 12/1977 | Gosling et al. | 83/278 X |

*Primary Examiner*—Frank T. Yost
*Attorney, Agent, or Firm*—F. Brice Faller

[57] ABSTRACT

Apparatus for dispensing flat jumper cable assemblies in strip form from reel comprises slot-like guide having parallel first and second surfaces which receive strip therebetween; channels in first surface receive terminals crimped on cable to prevent lateral shifting so various widths of cable can be dispensed. Elongate apertures in second surface provide access for pawls which bear on terminals to urge cable forward as pawl carrier is advanced horizontally by handle; control is then transferred to a blade carrier which is moved vertically to draw twin blades across cable to sever intermediate portion of cable and isolate individual assembly from strip.

6 Claims, 7 Drawing Figures

APPARATUS FOR DISPENSING FLAT CABLE ASSEMBLIES

BACKGROUND OF THE INVENTION

The present invention relates to an apparatus for feeding and severing predetermined lengths of flat cable, and particularly to reel-form cable assemblies having terminals fixed thereto.

U.S. Pat. No. 4,541,677, which is hereby incorporated by reference, discloses a continuous strip of jumper cable assemblies which is manufactured by crimping rows of terminals against one side of a flat flexible cable and perforating the cable proximate each row to facilitate isolating individual cable assemblies. The strip comprises a flat flexible cable having a plurality of continuous parallel conductors between dielectric lamina which define first and second sides of the cable. Each jumper cable assembly has a leading end, a trailing end, and a row of terminals crimped to respective conductors on the cable proximate each end. The terminals lie against the first side of the cable and have crimp tines which penetrate the cable and extend through the second side thereof. The trailing end of each assembly is adjacent the leading end of the next assembly and separated therefrom by an intermediate portion of cable. An apparatus which can feed a given length of the strip and sever same along the perforation lines would be desirable for conveniently dispensing the subject cable.

SUMMARY OF THE INVENTION

The inventive apparatus receives a continuous strip of jumper cable assemblies from a reel and dispenses an individual jumper cable assembly. The strip is received through a slot-like guide having closely spaced planar surfaces to contain the cable therebetween; one surface has channels which receive the terminals and the other has elongate apertures therein which parallel the feed path of the cable. The channels assure positive lateral placement of the cable so that any width of cable may be dispensed without suffering lateral shifting. A linearly reciprocable pawl carrier moves parallel to the feed path and carries pawls passing through respective apertures to bear against the crimp tines to urge the cable forward. A linearly reciprocable blade carrier having two blades then moves laterally of the feed path to sever from the strip an intermediate portion separating leading and trailing ends of adjacent cables. The bench apparatus disclosed herein employs a handle traveling in an L-shaped track which is transferred from the pawl carrier to the blade carrier when the desired length of cable has been moved forward.

While a bench apparatus is disclosed, the principles of the invention may be embodied in automatic or semiautomatic apparatus using pneumatic cylinders or the like.

BRIEF DESCRIPTION OF THE DRAWINGS

FIG. 5A is an enlarged view of the cable guide with a strip therein.

DETAILED DESCRIPTION OF THE PREFERRED EMBODIMENT

Figure 1:
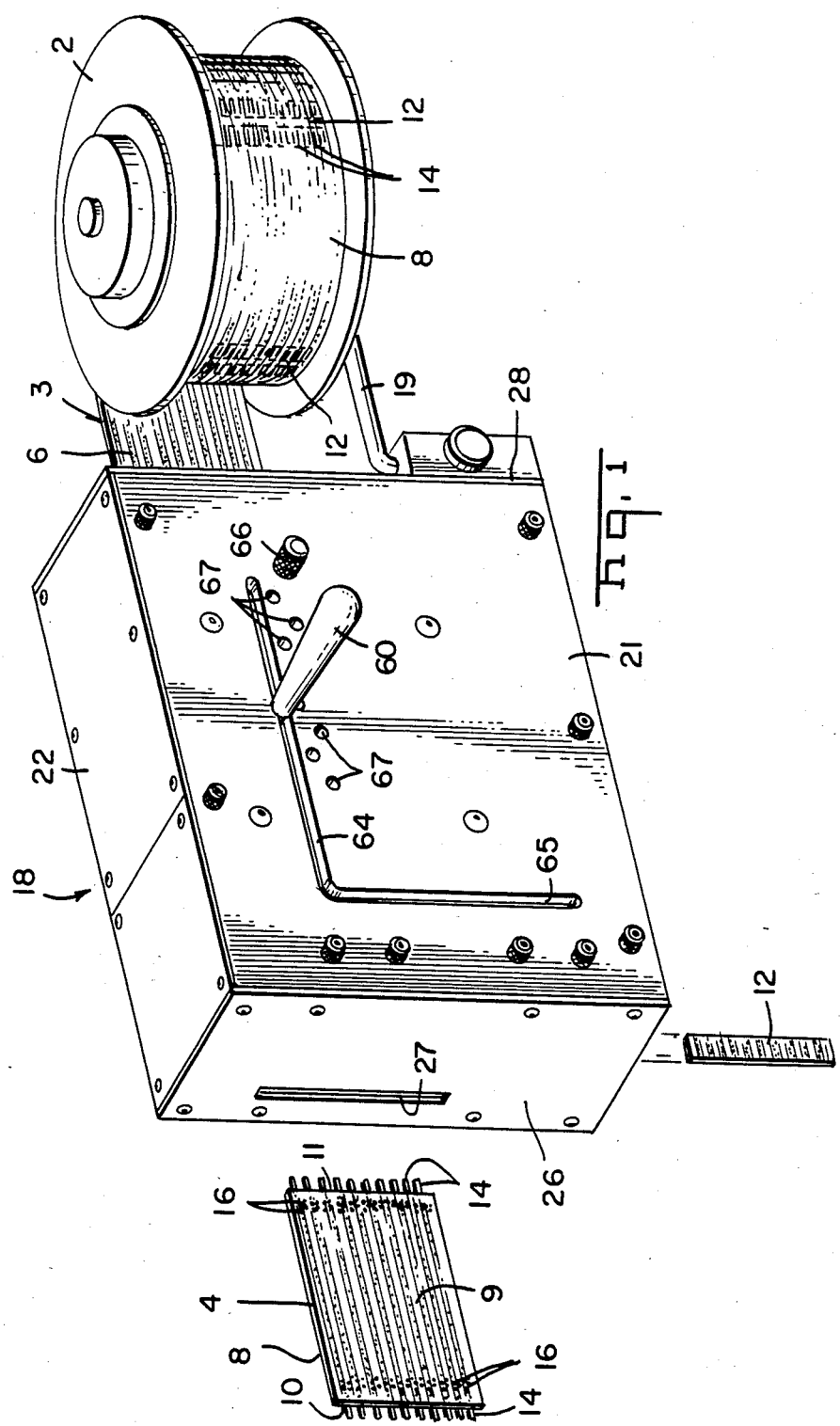
FIG. 1 is a perspective of the apparatus dispensing a cable assembly.

Referring to FIG. 1, the dispensing apparatus 18 of the present invention receives a continuous strip 3 of cable assemblies 4 from a reel 2 and dispenses individual the assemblies 4 after severing intermediate portions 12. Each assembly 4 has a first side 8 having terminals 14 crimped thereagainst and a second side 9 against which tines 16 are crimped. Each assembly has a leading end 10 and a trailing end 11 beyond which terminals 14 extend; the trailing end 11 is separated from the leading end 10 of the next assembly by an intermediate portion 12 which the apparatus 18 severs away along perforation lines described in U.S. patent application Ser. No. 638,835. Apparent external features of the apparatus 18 are the front plate 21, top plate 22, left end plate 26, and reel mounting spindle 19. The front plate 21 has a horizontal slot 64 through which handle 60 passes to advance a length of cable 6 equivalent to the length of an assembly 4 and an intermediate portion 12, and a vertical slot 65 to which handle 60 is transferred to isolate an individual assembly 4, which emerges from slot 27 in endwall 26.

Figure 2:
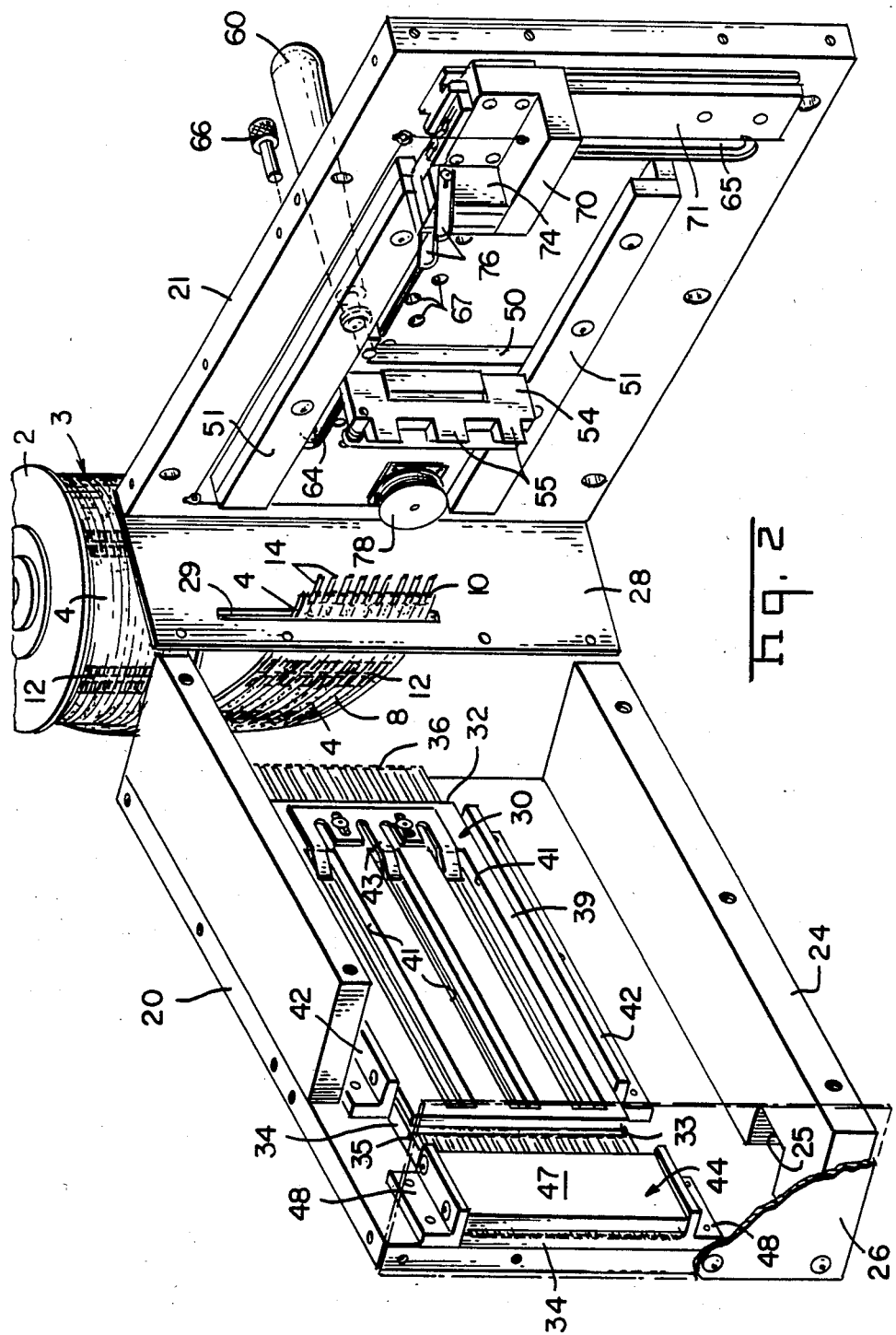
FIG. 2 is a perspective of the apparatus opened up to show internal mechanism on front and back plates.

FIG. 2 shows the back plate 20 and front plate 21 separated to expose features fixed thereto. A primary cable guide 30 having a first end 32 and a second end 33 and a secondary cable guide 44 share a common first guide plate 34 and have respective second guide plates 39, 47 fixed to back plate 20 by respective sets of brackets 42, 48. The plates 39, 47 are separated by space sufficient to sever intermediate portion 12 of the cable so it will fall through aperture 25 in base plate 24. The strip 3 of cable assemblies 4 is received through slot 29 of right end plate 28 with first side 8 oriented to lie against first surface 36 of guide 30.

A pawl carrier 50 slides reciprocably in guides 51 fixed to front plate 21 and has a pawl 54 pivotably attached thereto. Individual pawl blades 55 are profiled to fit in elongate apertures 41 in second guide plate 39 to advance the strip 3 when handle 60 is moved through slot 64 from first end 32 toward second end 33. Once the handle 60 has been moved to end 33, downward movement thereof through slot 65 transfers control to blade carrier 70, which rides downward on guide 71. Twin cutting blades 76 adjustably mounted to block 74 on carrier 70 thus sever the strip 3 between assemblies 4, the path of blades 76 paralleling transverse channels 35 in opposed first guide plate 34. After an assembly 4 is fed and severed, the handle 60 is returned vertically in slot 65 and horizontally in slot 64. Spring 78 effects return movement of blade carriage 70, and an anti-backup mechanism 43, in the form of spring fingers extending into apertures 41, prevents back-up of strip 3 during return of the pawl carriage 50. The mechanism 43 depicted is simply a piece of stamped and formed spring steel adjustably mounted to assure that the fingers lie adjacent crimp tines 16 (FIG. 5A) when the cable is advanced. The distal ends of the spring fingers face the second end 33 of guide 30 and thus abut the tines to prevent back-up. A stop 66 is mounted in a selected hole 67 in plate 21 to limit the travel of pawl carrier 50 to that required for a given length assembly 4. Note that for longer assemblies, the handle 60 may be returned in track 64 for a second feed stroke before being moved downward in slot 65 to engage carriage 70.

Figure 3:
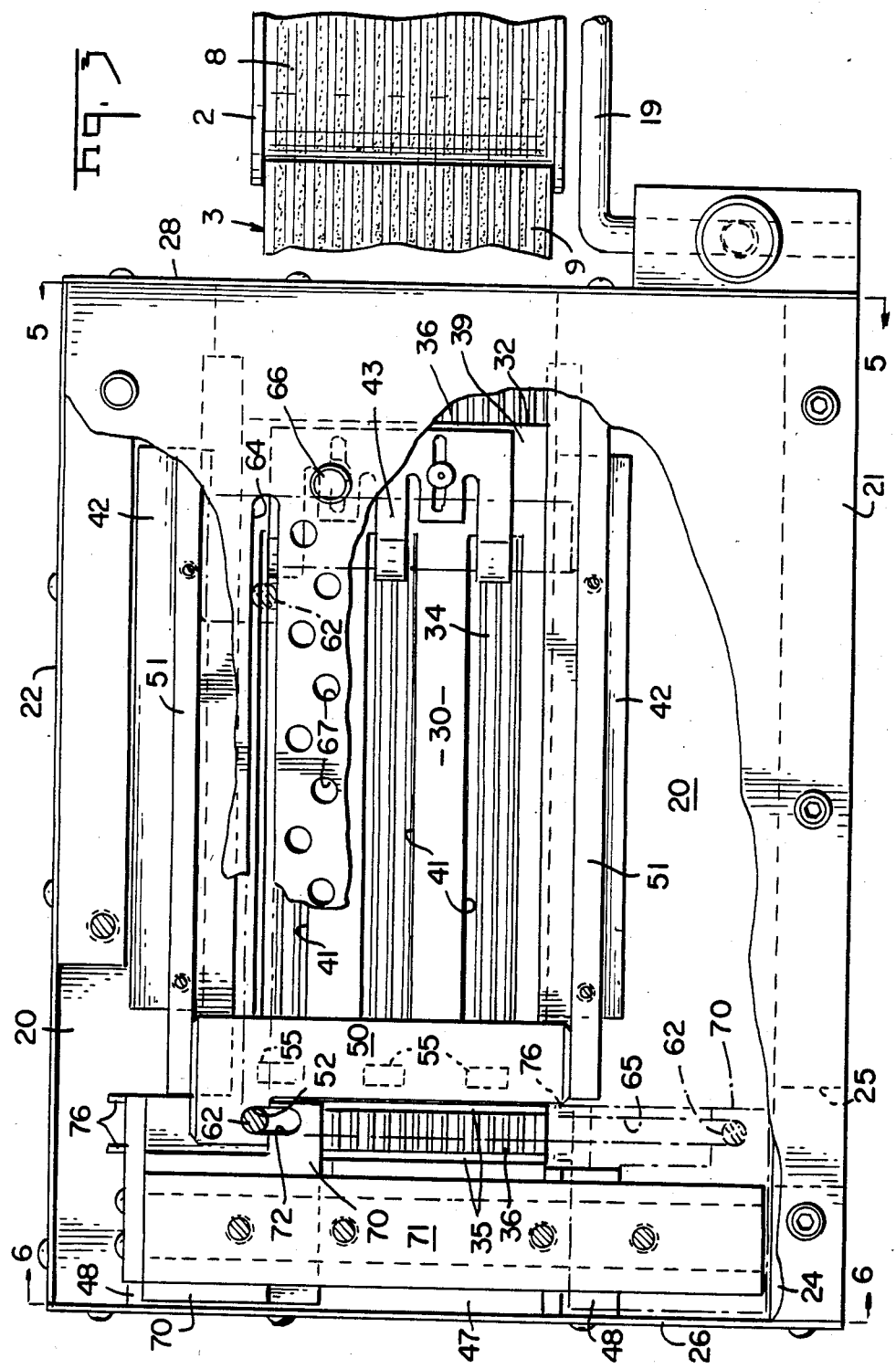
FIG. 3 is a front cutaway elevation taken as the handle transfers from the pawl carrier to the blade carrier; positions at the beginning of the pawl stroke and end of the blade stroke are shown in phantom.

FIG. 3 is a cutaway elevation showing in section the peg 62, which is the extension of handle 60. At the initial position, shown in phantom, the peg 62 is toward the right end of slot 64 as the pawl carrier 50 is stopped by peg 66. After the pawl carrier 50 has been moved fully leftward to advance the strip 3, the inverted U-slot 52 in carrier 50 is aligned directly above the U-slot 72 in blade carrier 70 as shown. This permits transfer of control from carrier 50 to carrier 70 as peg 62 is moved downward in slot 65 from the position shown to the final position, shown in phantom.

Figure 4:
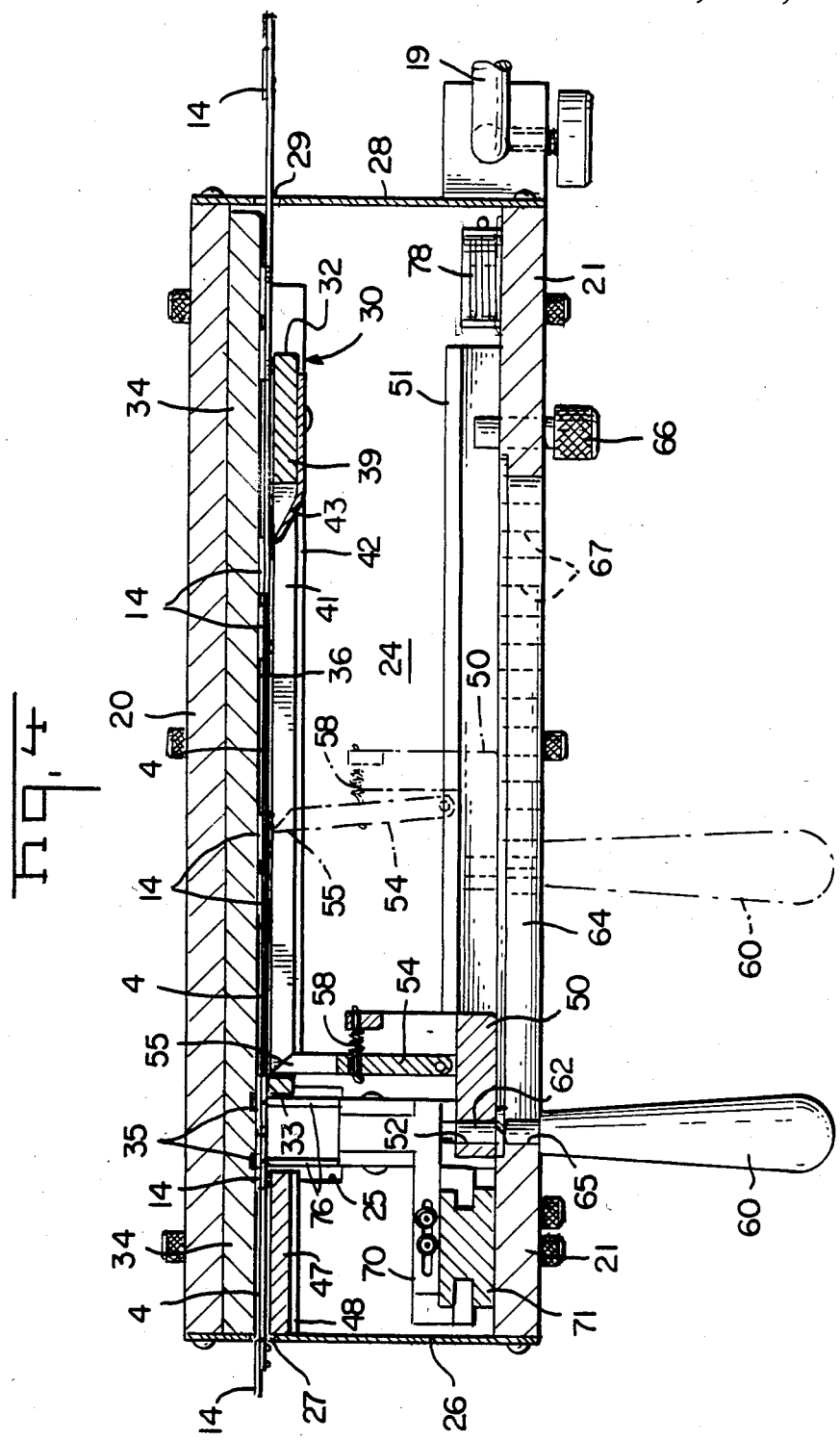
FIG. 4 is a top section view.

FIG. 4 is a top section view showing the action of the pawl blades 55 on terminals 14 as handle 60 is advanced. When the pawl carrier 50 is returned, the blades ride over the terminals against the action of spring 58, as shown in phantom, while the drag mechanism 43 prevents the strip 3 from backing up. Note that blades 76 line up with transverse channels 35 in guide plate 34 but do not enter same as the terminals 14 are interposed.

Figure 5:
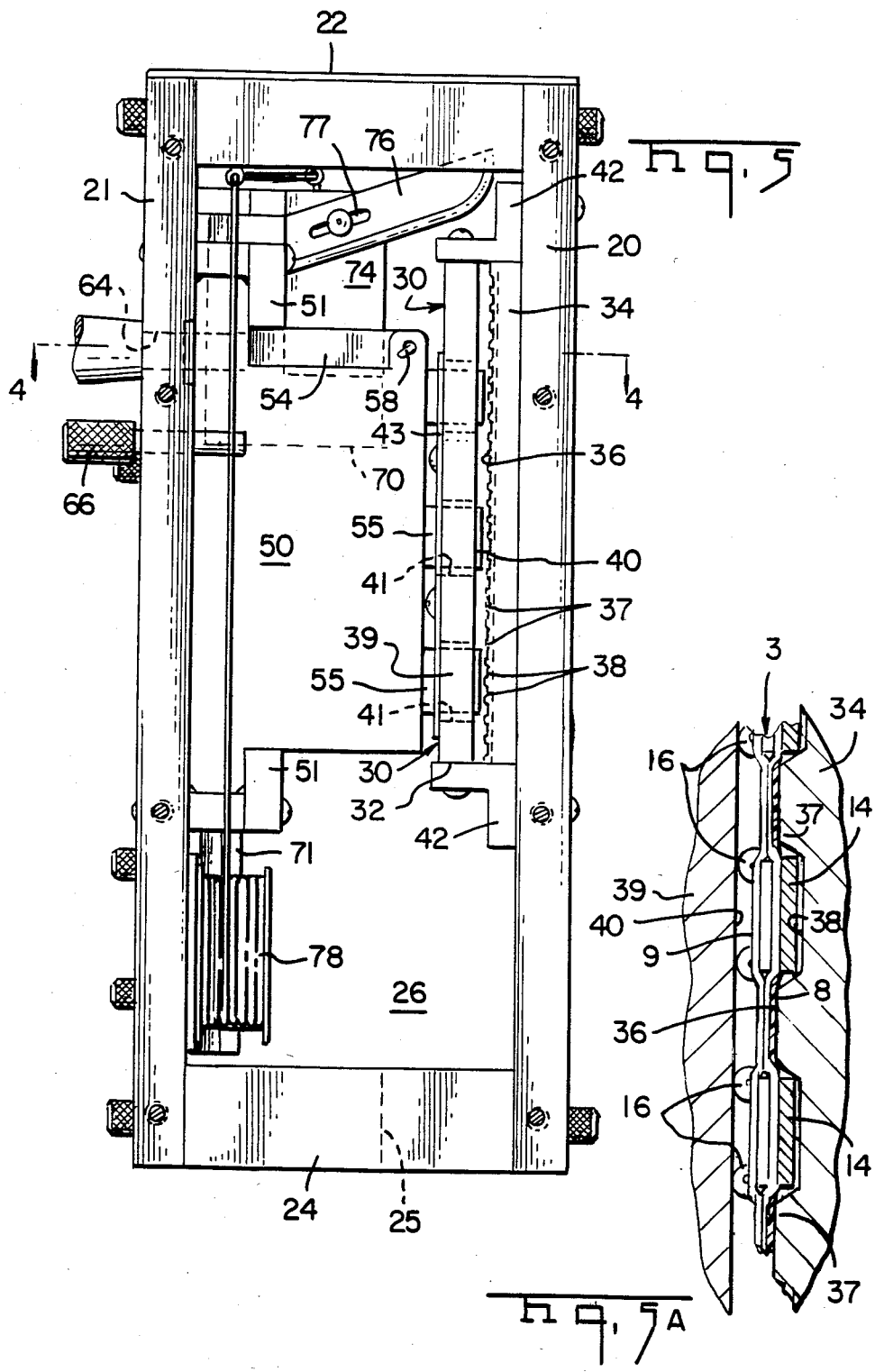
FIG. 5 is an elevation of the input end of the apparatus.

FIG. 5 is an endview of the apparatus looking at the first end 32 of the primary slot-like cable guide 30 which comprises first guide plate 34 and second guide plate 39 having respective first and second planar surfaces 36, 40 thereon spaced sufficiently closely to contain strip 3 therebetween. The first surface 36 has a plurality of parallel ridges 37 thereon defining a plurality of parallel channels 38 therebetween. FIG. 5A is a partial end cross section showing the guide 30 with strip 3 therein. The terminals 14 are on 0.100 in. centers and are crimped to respective conductors in cable 4 which are likewise on 0.100 in. centers. Channels 38 are spaced as terminals 14 in a row and are profiled to receive the terminals therein. The terminals 14 lie against first side 8 of strip 3, which faces first surface 36 on first guide plate 34, the portion of strip 3 between terminals 14 riding on ridges 37 between channels 38. The second side 9 of strip 3 faces second surface 40 on second guide plate 39, as crimp tines 16 ride thereagainst. The second surface 40 is spaced sufficiently closely to first surface 36 to contain the terminals in channels 38 to prevent lateral shifting of the cable.

Figure 6:
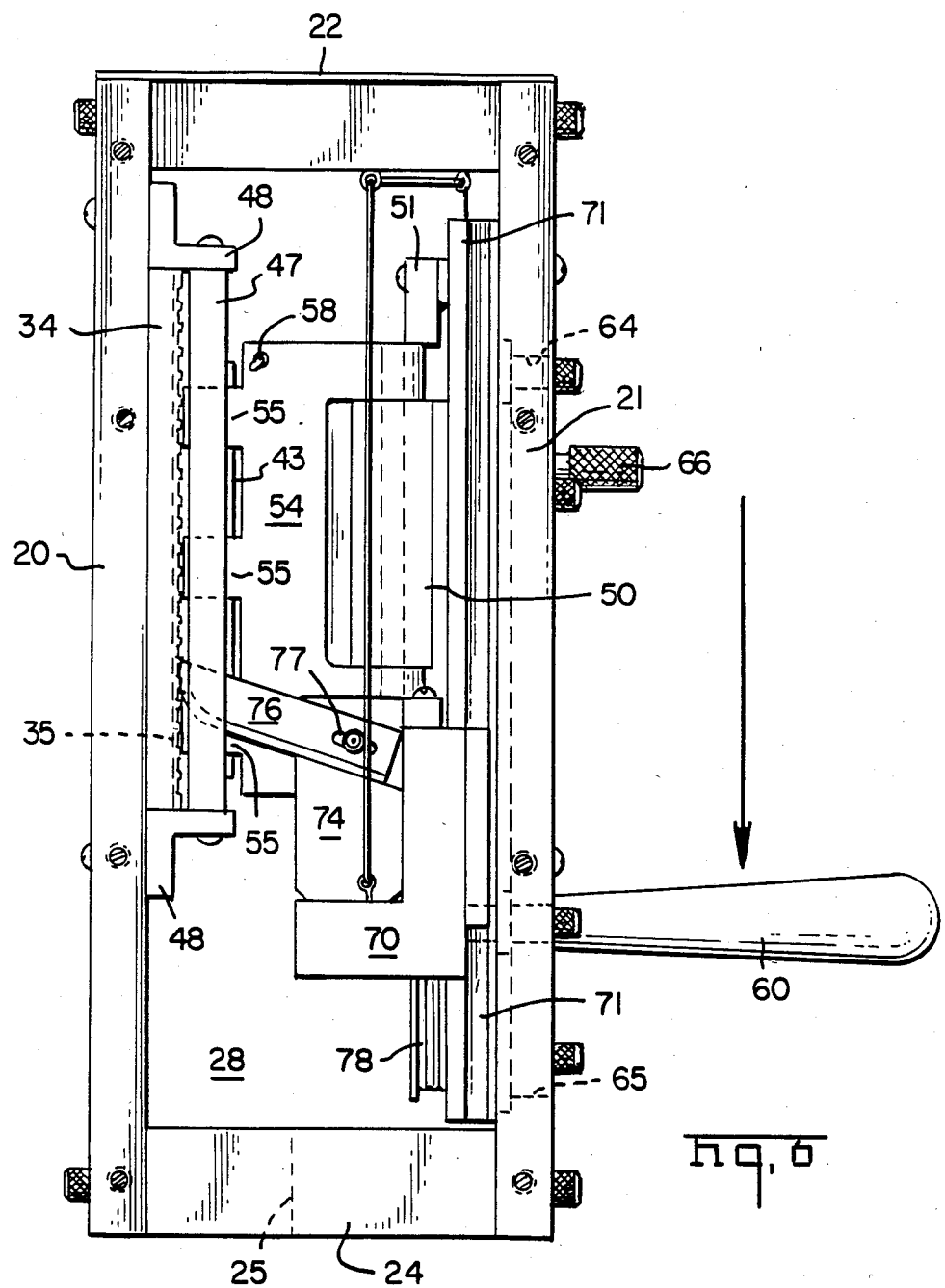
FIG. 6 is an elevation of the output end of the apparatus.

FIG. 6 is an end view of the apparatus looking at the second end of secondary cable guide 44. Pawl carrier 50 is at rest in guide 5 toward the viewer with pawls 55 extending into apertures 41 behind second guide plate 47. Handle 60 is at the bottom of its vertical travel in slot 65 moving blade carrier 70 therewith in guide 71 as blade 76 traverse first guide plate 34. Note that blades 76 have slots 77 to permit adjustable mounting to block 74 for controlled slit depth.

The foregoing is exemplary and not intended to limit the scope of the claims which follow.

I claim:

1. Apparatus for severing individual jumper cable assemblies from a continuous strip thereof, the strip comprising a flat flexible cable having a plurality of continuous parallel conductors between dielectric lamina which define first and second sides of the cable, each jumper cable assembly having a leading end, a trailing end, and a row of terminals crimped to respective conductors in the cable proximate each end, each terminal lying against the first side of the cable and having crimp tines which penetrate the cable and extend through the second side thereof, the trailing end of each assembly being adjacent the leading end of the next assembly and separated therefrom by an intermediate portion of cable, the apparatus comprising a slot-like guide for guiding the continuous strip in a feed path therethrough from a first end to a second end thereof, the guide comprising parallel first and second substantially planar surfaces, said first surface having a plurality of parallel ridges defining a plurality of parallel channels therebetween, said channels being spaced as terminals in one of said rows and profiled to receive respective terminals of said row therein, said second surface facing said first surface and being spaced sufficiently closely thereto to contain said terminals in said channels and thus prevent lateral shifting of said cable in said slot, one of said surfaces having elongate aperture means therein which parallels the feed path of said cable, linearly reciprocable pawl means for engaging said terminals through said aperture means and moving a cable assembly from said first end toward said second end, anti-back-up means to prevent back up of said cable when said pawl returns from said second end to said first end, severing means adjacent the second end of said slot and movable laterally across the feed path on the second side of said cable to sever an intermediate portion from said strip and thus isolate a jumper cable assembly.

2. Apparatus as in claim 1 wherein said elongate apertures are in said second surface, said pawl means engaging said crimp tines.

3. An apparatus as in claim 2 wherein said pawl means and said severing means are slidably mounted on plate means having a first slot paralleling said feed path therein and a second slot paralleling the path of said severing means there n, said slots being joined to form a continuous L-shaped slot having journaled therein for movement parallel thereto a handle, the handle acting on said pawl means when in said first slot and on said severing means when in said second slot.

4. An apparatus as in claim 3 wherein said first slot is situate horizontally and said second slot is situate vertically, whereby gravity may be employed to move the intermediate portion of cable laterally of the feed path subsequent to severing.

5. An apparatus as in claim 1 wherein stop means is provided at any one of selected locations paralleling the feed path, whereby the feed path may be adjusted to different length cable assemblies.

6. An apparatus as in claim 1 wherein the anti-back-up means comprises at least one spring finger disposed against said second side of said strip through said aperture means, the distal end of said spring finger facing said second end of said guide.

* * * * *